Patented Jan. 4, 1938

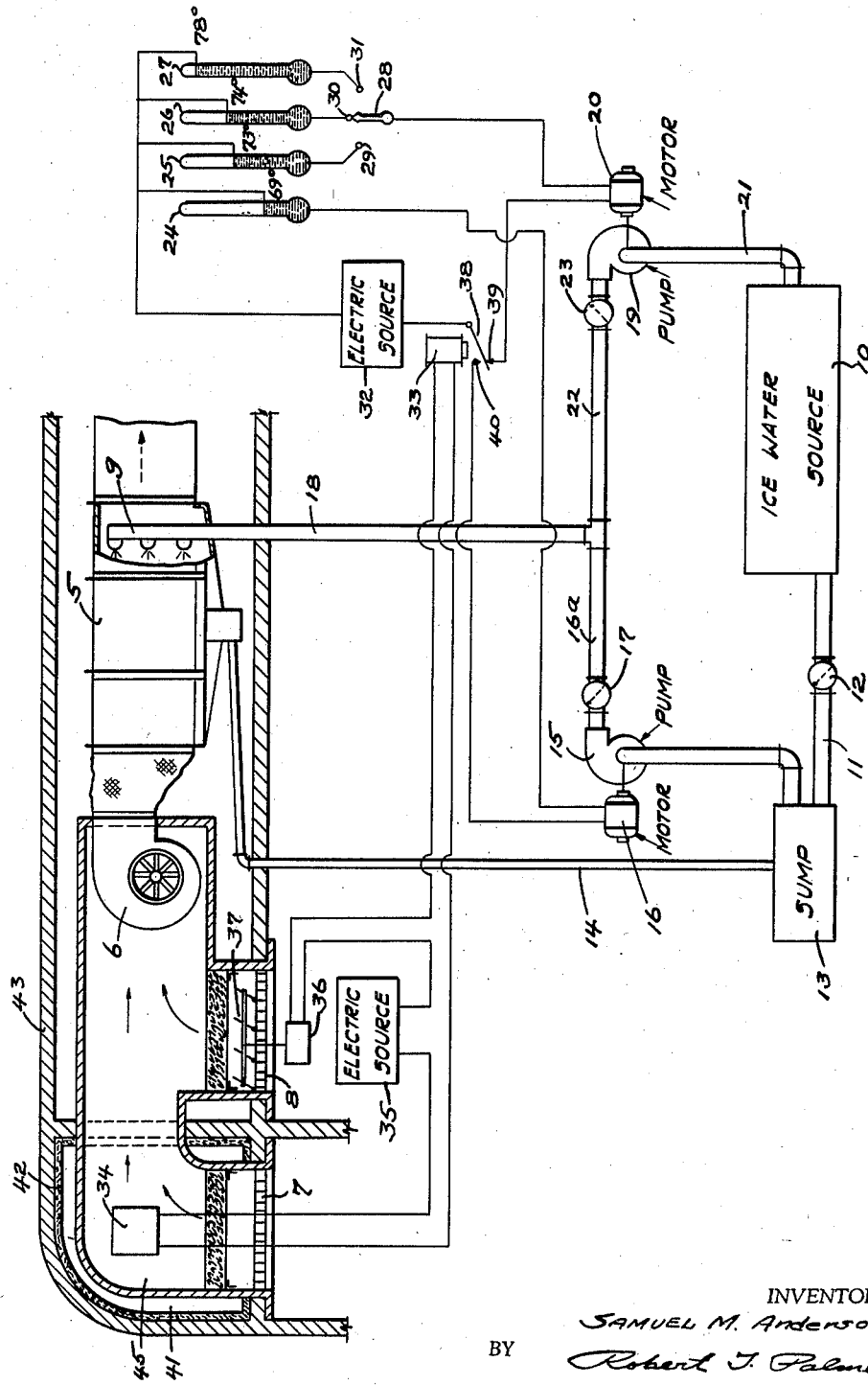

2,104,475

UNITED STATES PATENT OFFICE 2,104,475

SPRAY TYPE CONDITIONER FOR PASSENGER VEHICLES

Samuel M. Anderson, Sharon, Mass., assignor to B. F. Sturtevant Company, Boston, Mass.

Application November 11, 1936, Serial No. 110,289

12 Claims. (Cl. 236—44)

This invention relates to air conditioning systems for passenger vehicles, and relates more particularly to an air conditioning system utilizing evaporative cooling and cooling by refrigeration.

By using cooling systems of the washer or spray type, it is possible when the wet bulb temperature of the outside air, is sufficiently low, to provide the necessary cooling effect by evaporative cooling without the use of refrigeration. An air conditioning system utilizing evaporative cooling as well as cooling by refrigeration is particularly adapted for passenger vehicles, such for example, as railroad passenger cars which pass through regions in which different temperature and humidity conditions prevail.

A feature of this invention resides in the provision of a spray type cooling system for passenger vehicles, in which the operation of the system is controlled automatically by means responsive to changes in the wet bulb temperature of the outside air and by means responsive to conditions within the passenger space.

According to another feature of the invention, means responsive to changes in the wet bulb temperature of the outside air elects whether evaporative cooling, or cooling by refrigeration is to be employed, and controls the indoor thermostats to prevent changes in temperature due to changes in the operation of the system from evaporative cooling to cooling by refrigeration.

According to another feature of the invention, applied to a railroad passenger car, an insulated vestibule is provided to ensure that the outside air entering the conditioner is unchanged from its natural condition, as by sun effect, etc. In the usual car, outside air entering the system through an uninsulated vestibule has its wet bulb temperature increased, so that it is less effective for evaporative cooling.

An object of the invention is to provide a complete air conditioning system for cooling by refrigeration, and by evaporative cooling.

Another object of the invention is to provide that the outside air entering the conditioner of a railroad passenger car is unchanged from its natural condition.

Another object of the invention is to provide automatic controls responsive to conditions in the passenger space of a passenger vehicle, and to provide a supervisory control responsive to changes in the wet bulb temperature of the outside air.

Other objects of the invention will be apparent from the following description taken together with the drawing.

The invention will now be described with reference to the drawing which illustrates a diagrammatic view of a complete air conditioning system with controls for a railroad passenger car.

In the embodiment of the invention illustrated, the spray type conditioner 5 is mounted in one end, and in the roof zone of a railroad passenger car. The blower 6 draws fresh air through the inlet 7 and recirculated air through the inlet 8 and forces it through the conditioner 5 and then discharges it in the passenger space. The conditioner 5 contains the plurality of spray nozzles 9 which are supplied with refrigerated water to wash and cool the air to be conditioned. The refrigerated water is supplied by the ice water source 10, and may be cooled through the meltage of ice or may be cooled by the evaporators of any well known type of refrigerating system. The water returning from the conditioner 5 flows through the pipe 14 into the sump 13 and then through the one way check valve 12 in the pipe 11 into the source 10. The pump 15 driven by the motor 16 draws water from the sump 13 and forces it through the pipe 16a and check valve 17 and pipe 18 to the spray nozzles during the evaporative cooling cycle. The pump 19 driven by the motor 20 draws ice water through the pipe 21 from the source 10 and forces it through the pipe 22, check valve 23, and pipe 18 during the refrigerating cooling cycle. These cycles of operation will be explained in detail in the following.

Mounted within the passenger space of the car are four thermometers or thermostats 24, 25, 26, and 27. The thermometer 24 is adjusted to operate at an indoor dry bulb temperature of 69° F. and functions only during the evaporative cooling cycle. The thermometers 25, 26, and 27 are arranged to control the indoor temperature during the refrigerating cooling cycle, only one of these thermometers functioning at a time. The particular one of these three indoor thermometers which controls the indoor temperature is selected by a car attendant who places the switch 28 on one or the other of the three contacts 29, 30, or 31. The thermometer 25 is adjusted to operate at an indoor dry bulb temperature of 73° F. The thermometer 26 is adjusted to operate at an indoor dry bulb temperature of 74° F. and the thermometer 27 is adjusted to operate at an indoor dry bulb temperature of 78° F. The control switch 28 connects one or the other of the thermometers 25, 26, or 27 in series with the electric source 32, contacts in the relay 33, and the motor 20 driving the pump 19. The relay 33 is provided, as will be explained in more detail in the following, to prevent the thermometers 25, 26, and 27 from functioning during the evaporative cooling cycle and to prevent the thermometer 24 from functioning during the refrigerating cooling cycle. During the refrigerating cooling cycle, the car attendant adjusts the position of the contact on 28 to maintain the desired indoor temperature when the air feels too warm or too cold. The thermostat 25 starts and stops the pump motor 20 during the refrigerating cooling cycle when the dry bulb temperature of the indoor air is above and below respectively 73°. The thermostat 26 functions likewise at 74° F. and the thermostat 27 functions likewise at 78° F. For example, if the arm 28 is on contact 29, causing the thermostat 25 to operate at the 73° F. temperature, if a passenger complains that the air is too cold, the thermostat 26 or 27 may be put into operation to maintain a higher temperature.

During the evaporative cooling cycle, the thermostat 24 controls the motor 16 driving the pump 15. It is connected as shown, in series with the electric source 32, the relay 33 and the motor 16, the relay 33 being controlled by the device 34 responsive to changes in the wet bulb temperature of the outside air, which elects when evaporative cooling is to be employed and elects whether or not the indoor thermostat 24 or one of the other indoor thermostats 25, 26 or 27 is to control the indoor temperature.

The device 34 is mounted in the path of the outside air entering the conditioner. When the wet bulb temperature of the outdoor air is above a predetermined temperature which may be, for example, 60° F., the device 34 functions to open a circuit including the electric source 35, the motor 36 controlling the position of the dampers 37 in the recirculated air inlet 8, and the winding of the relay 33. The armature 38 of the relay then rests against the contact 39, connecting the electric source 32 to the pump motor 20, thus causing the motor 20 to be energized and its associated pump 19 to be operated to force ice water from the source 10 to the spray nozzles 9 in the conditioner 5.

At this time, the armature 38 is removed from the contact 40 which is connected in series with the thermostat 24, the electric source 32, and the motor 16 driving the water by pass pump 15.

At this time, the damper control motor 36 is controlled to hold the dampers 37 open, thus admitting recirculated air to the blower 6.

When the wet bulb temperature is below 60° F., the device 34 functions to close the circuit including the electric source 35, the damper control motor 36 and the relay 33. This causes the relay 33 to be energized to pull down the armature 38 and to close the circuit including the contact 40, the thermostat 24, the electric source 32, and the motor 16 driving the by-pass pump 15. This causes the motor 16 to become energized, when the indoor dry bulb temperature is above 69° F., under control of thermostat 24. The thermostats 25, 26, and 27 can not function to control the indoor temperature at this time, due to the fact that the armature 38 is removed from the contact 39 which functions when the relay is deenergized to place one or the other of these thermostats in control.

At this time, the damper control motor 36 becomes energized to close the dampers 37 to prevent recirculated air from entering the conditioner.

As illustrated, the vestibule 41 of the car is insulated by the layer of insulating material 42, from the roof 43 of the car. The duct 45 leading to the outside air entering the lower part of the vestibule, passes through this insulation. The device 34 responsive to change in the wet bulb temperature is mounted in the duct 45. As a result of this construction, the outside air entering the conditioner through the duct 45 is unheated during its passage through the duct, so that its wet bulb temperature is lower than were it subjected to heat from the roof area of the car, so that it is more effective for evaporative cooling. The device 34 is also insulated from heat and responds therefore, accurately to changes in the wet bulb temperature of the outdoor air.

It is important to supervise the operation of the indoor thermostats to prevent the thermostat 24 from functioning during the refrigerating cooling cycle. This may be easily demonstrated by an illustration of temperature conditions which resulted from tests in which a thermostat similar to thermostat 24 was permitted to function during the refrigerating cooling cycle. During the evaporative cooling cycle, the thermostat 24 opens and closes the circuit of the motor 16 when the dry bulb temperature of the indoor is above and below respectively 69° F. This results in a comfortable condition despite the apparently low indoor temperature due to the fact that a higher wet bulb temperature exists within the car during the evaporative cooling cycle. This results in a relatively high effective temperature. But, when the 69° F. thermostat is permitted to turn on the supply of refrigerated water to the sprays, dehumidification takes places, with the result that a lower wet bulb temperature is maintained within the car with a considerably lower effective temperature. Likewise, were the thermostats 25, 26, or 27 permitted to operate during the evaporative cooling cycle, they would maintain undesirable indoor conditions, since when high wet bulb temperatures occur during the evaporative cooling cycle, it is undesirable to maintain high dry bulb temperatures.

Another advantage of this type of control is that when the system is switched by the device 34 from evaporative cooling to cooling by refrigeration, the dry bulb temperature of the indoor air is permitted to climb several degrees before refrigerated water is supplied to the sprays by one of the thermostats 25, 26, or 27 so that there is no shock which might be occasioned by a sudden change in effective temperature.

According to another feature of the invention, the sump 13 is made air tight, so that full advantage of the difference in water head existing between the conditioner 5 and the sump 13 may be had to decrease the work required of the pump driving motors 16 and 20. The sump 13 is mounted on the underside of the car and the conditioner 5 is mounted in the upper portion of the car.

There is considerable difference of elevation resulting in a static head which tends to force the water from the sump 13 to the level of the conditioner. This results in the pumps being relieved of a part of their load and results in a decrease in current consumption, which is important, particularly on railroad passenger cars.

While, one embodiment of the invention has been described for the purpose of illustration, it should be understood that the invention is not limited to the exact arrangement described, since many modifications may be made by those skilled in the art, without departing from the spirit of the invention.

What is claimed is:

1. Air conditioning apparatus for a passenger vehicle, comprising a cooler, spray nozzles in said cooler, means for passing outside air through said cooler and for discharging it into the passenger space of said vehicle, circulating means for supplying a liquid to said spray nozzles and for returning the liquid from said cooler, refrigerating means for cooling said liquid, means for routing said liquid through said refrigerating means, by-pass means for by-passing said liquid around said refrigerating means, control means for placing into operation said by-pass means and for rendering inoperative said means for routing said liquid through said refrigerating means when the wet bulb temperature of the outside air is below a predetermined point, and means controlled by said control means and responsive to conditions within the passenger space for controlling the supply of liquid to said nozzles.

2. Air conditioning apparatus for a passenger vehicle, comprising a cooler, spray nozzles in said cooler, means for passing outside air through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, control means for placing into operation said means for routing said liquid through said refrigerating means and for rendering inoperative said by-pass means when the wet bulb temperature of the outside air is above a predetermined point, and means controlled by said control means and responsive to conditions within the passenger space for controlling the supply of liquid to said nozzles.

3. Air conditioning apparatus for a passenger vehicle, comprising a cooler, spray nozzles in said cooler, means for passing outside air through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, a pair of thermostats within said passenger space for controlling the supply of liquid to said nozzles, one of said thermostats being operative at a given temperature to control said by-pass means and the other of said thermostats being operative at a higher temperature to control said routing means, control means for placing into operation said by-pass means and for rendering inoperative said means for routing said liquid through said refrigerating means when the wet bulb temperature of the outside air is below a predetermined point, and means controlled by said control means for placing said one of said thermostats into operation and for placing said other of said thermostats out of operation.

4. Air conditioning apparatus for a passenger vehicle, comprising a cooler, spray nozzles in said cooler, means for passing outside air through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, a pair of thermostats within said passenger space for controlling the supply of liquid to said nozzles, one of said thermostats being operative at a given temperature to control said by-pass means and the other of said thermostats being operative at a higher temperature to control said routing means, control means for placing into operation said means for routing said liquid through said refrigerating means and for rendering inoperative said by-pass means when the wet bulb temperature of the outside air is above a predetermined point, and means controlled by said control means for placing said other of said thermostats into operation and for placing said one of said thermostats out of operation.

5. Air conditioning apparatus for a passenger vehicle, comprising a cooler, spray nozzles in said cooler, means for passing outside air and air recirculated from the passenger space through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, control means for placing into operation said by-pass means, for discontinuing the supply of recirculated air to said cooler, and for rendering inoperative said means for routing said liquid through said refrigerating means when the wet bulb temperature of the outside air is below a predetermined point, and means controlled by said control means and responsive to conditions within the passenger space for controlling the supply of liquid to said nozzles.

6. Air conditioning apparatus for a passenger vehicle, comprising a cooler, spray nozzles in said cooler, means for passing outside air and air recirculated from the passenger space through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, control means for placing into operation said means for routing said liquid through said refrigerating means, for rendering inoperative said by-pass means, and for continuing the supply of recirculated air to said cooler, when the wet bulb temperature of the outside air is above a predetermined point, and means controlled by said control means and responsive to conditions within the passenger space for controlling the supply of liquid to said nozzles.

7. Air conditioning apparatus for a passenger vehicle, comprising a cooler, spray nozzles in said cooler, means for passing outside air and air recirculated from the passenger space through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, a pair of thermostats within said passenger space for controlling the supply of liquid to said nozzles, one of said thermostats being operative at a given temperature to control said by-pass means and the other of said thermostats being operative at a higher temperature to control said routing means, control means for placing into operation said by-pass means, for discontinuing the supply of recirculated air to said cooler, and for rendering inoperative said means for routing said liquid through said refrigerating means when the wet bulb temperature of the outside air is below a predetermined point, and means controlled by said control means for placing said one of said thermostats into operation and for placing said other of said thermostats out of operation.

8. Air conditioning apparatus for a passenger vehicle, comprising a cooler, spray nozzles in said cooler, means for passing outside air and air recirculated from the passenger space through said cooler and for discharging it into the passenger space of said vehicle, circulating means for supplying a liquid to said nozzles and for returning the liquid from said cooler, refrigerating means for cooling said liquid, means for routing said liquid through said refrigerating means, by-pass means for by-passing said liquid around said refrigerating means, a pair of thermostats within said passenger space for controlling the supply of liquid to said nozzles, one of said thermostats being operative at a given temperature to control said by-pass means and the other of said thermostats being operative at a higher temperature to control said routing means, control means for discontinuing the operation of said by-pass means, for continuing the supply of recirculated air to said cooler and for rendering operative said means for routing said liquid through said refrigerating means when the wet bulb temperature of the outside air is above a predetermined point, and means controlled by said control means for placing said other of said thermostats into operation and for placing said one of said thermostats out of operation.

9. Air conditioning apparatus for a passenger vehicle, comprising a cooler, spray nozzles in said cooler, means for passing outside air through said cooler and for discharging it into the passenger space of said vehicle, refrigerating means for cooling a liquid, supply means for supplying said liquid from said refrigerating means to said nozzles, control means responsive to conditions in the passenger space for controlling the supply of liquid to said nozzles, means for returning the liquid from said cooler, a second supply means for recirculating the water returned from said cooler, to said nozzles for evaporative cooling, a second control means responsive to conditions in the passenger space for controlling the supply of liquid to said nozzles during evaporative cooling, and means for placing said first mentioned supply means and said first mentioned control means in operation or for placing said second supply and said second control means in operation.

10. Air conditioning apparatus for a passenger vehicle, comprising a spray cooler, means for passing outside air through said cooler and for discharging it into the passenger space of said vehicle, refrigerating means for cooling a liquid, supply means for supplying said liquid from said refrigerating means to said cooler, control means responsive to conditions in the passenger space for controlling said last mentioned means, means for returning the liquid from said cooler, a second supply means for recirculating the water returned from said cooler, to said cooler, a second control means responsive to conditions in the passenger space for controlling said last mentioned means, and means responsive to changes in the wet bulb temperature of the outside air for placing said first mentioned supply means and said first mentioned control means in operation or for placing said second supply and said second control means in operation.

11. Air conditioning apparatus for a passenger vehicle, comprising a spray cooler, means for passing outside air and air recirculated from the passenger space through said cooler and for discharging it into the passenger space of said vehicle, refrigerating means for cooling a liquid, supply means for supplying said refrigerating means to said cooler, control means responsive to conditions in the passenger space for controlling said last mentioned means, means for returning the liquid from said cooler, a second supply means for recirculating the water returned from said cooler, to said cooler, a second control means responsive to conditions in the passenger space for controlling said last mentioned means, and means for placing said first mentioned supply means and said first mentioned control means in operation or for placing said second supply and said second control means in operation and discontinuing the supply of recirculated air to said cooler.

12. Air conditioning apparatus for a passenger vehicle, comprising a spray cooler, means for passing outside air and air recirculated from the passenger space through said cooler and for discharging it into the passenger space of said vehicle, refrigerating means for cooling a liquid, supply means for supplying said liquid from said refrigerating means to said cooler, control means responsive to conditions in the passenger space for controlling said last mentioned means, means for returning the liquid from said cooler, a second supply means for recirculating the water returned from said cooler, to said cooler, a second control means responsive to conditions in the passenger space for controlling said last mentioned means, and means responsive to changes in the wet bulb temperature of the outside air for placing said first mentioned supply means and said first mentioned control means in operation or for placing said second supply and said second control means in operation and discontinuing the supply of recirculated air to said cooler.

SAMUEL M. ANDERSON.